United States Patent Office 2,745,718
Patented May 15, 1956

2,745,718
METHOD OF SEPARATING PHOSPHATE IONS FROM IRON IONS

Johan Halberstadt, Amsterdam, Netherlands, assignor to Hartford National Bank and Trust Company, Hartford, Conn., as trustee No Drawing. Application May 23, 1952,
Serial No. 289,681

Claims priority, application Netherlands June 5, 1951

5 Claims. (Cl. 23—165)

The invention relates to methods of separating phosphate ions from iron ions, the aim being to produce an analytically pure phosphate solution from a solution which contains iron ions and, possibly, cationary and anionary impurities.

It is known that phosphate ions can be separated from iron ions in solution by acidifying and precipitating the phosphate ions by means of ammonium molybdate, in which case the iron ions remain in solution and therefore cannot disturb the separation. In order to obtain phosphorus as alkaline phosphate from the deposit produced, it is converted in an ammoniacal solution containing magnesia mixture, i. e. an aqueous solution of ammonium chloride, ammonia and magnesium chloride, into magnesium ammonium phosphate, the latter is boiled with caustic soda solution so that the phosphate is dissolved and magnesium hydroxide is partly precipitated.

The said method takes much time, the duration is about two days and, in many cases, it gives rise to appreciable losses of phosphate, particularly if the conversion of magnesium ammonium phosphate with caustic soda into sodium phosphate and magnesium hydroxide is not carried out carefully.

It is also known (Hillebrand and Lundell: Inorganic Anlysis 1946, New York; see particularly page 76) that phosphorus can be separated from iron by treating a solution of a phosphate salt and an iron salt with caustic soda solution. In this manner the iron may be separated out completely in the form of iron hydroxide. Any impurities, such as cobalt ions or manganese ions are furthermore separated out with the iron hydroxide, so that the phosphate solution can also be freed from these cations. By this method, however, anionary impurities cannot be separated out of the solution.

Thirdly, it is known that phosphate ions can be separated in the form of bismuth phosphate from bivalent ions, such as manganese, nickel, cobalt by a method described by Keshan in "Zeitschrift für analytische Chemie," 128, 216 (1947–48). According to this publication, the method concerned cannot be carried out to separate phosphate ions from ferric ions, since the latter are partly absorbed by bismuth phosphate.

According to the invention a method of producing an aqueous solution of phosphate ions from a solution containing phosphate ions and iron ions is characterised in that the phosphate ions are separated from the iron ions by the following successive measures: precipitation of iron hydroxide in an alkaline solution; separation of the precipitate containing primarily iron hydroxide; precipitation of phosphate ions contained in the filtrate in an acid solution by adding bismuth salts or an aqueous liquid containing bismuth ions; separation of the precipitated bismuth phosphate obtained; dissolving this precipitate in an aqueous solution of hydrogen halogen acid, precipitation of bismuth ions in the form of bismuth sulphide, preferably by the introduction of hydrogen sulphide, or in the form of a bismuthyl salt by hydrolysis of the solution by means of water; separation of the precipitate produced and, if necessary, evaporation of the filtrate in order to free the phosphate solution from unwanted volatile acids.

If desired, cations may be added to the solution of phosphoric acid thus obtained.

With the method according to the invention, care must be taken that no halide ions are contained in the solution to be worked prior to the stage in which bismuth ions are added to the solution, since it is known from the publication of Keshan that bismuth phosphate is precipitated incompletely or not at all if halide ions are contained in the phosphate solution.

Over the ammonium molybdate magnesia mixture method, the method according to the invention provides an appreciable economy of time (the duration of the separation according to the invention is about 8 hours) and furthermore, substantially no loses of phosphate ions occur.

The method according to the invention is particularly advantageous for the production of a radioactive $P^{32}$ preparation from phosphorus iron which has been bombarded by deuterons. The decomposition of the phosphorus iron may be carried out by the known methods, for example, in an alkaline oxidation mixture consisting of solid sodium hydroxide and sodium nitrate. However, it is not advisable to separate out the phosphorus iron by means of aqua regia, since the chlorine ions contained therein would prevent the quantitative precipitation of bismuth phosphate.

$P^{32}$ has a time constant of only 14.1 days. If separation of the radioactive $P^{32}$ from iron is carried out by the ammonium molybdate magnesia mixture method, an appreciable loss in radio-activity occurs owing to the long operation time (about two days). This may be avoided by using the method according to the invention.

With the method according to the invention a radioactive preparation is furthermore obtained, containing substantially no undesired cationary or anionary impurities, for example, those which might be contained in the starting material. More particularly, radioactive cobalt ions and radioactive manganese ions are separated out with the iron hydroxide precipitated during the alkaline decomposition. This great purity is highly desirable, since radioactive phosphate preparations are used in sicence and medicine.

The invention will now be explained with reference to the following examples.

Example I

About 2 g. of phosphorus iron which had been bombarded by deuterons was powdered finely in a mortar and mixed in a ratio of about one part to ten parts by weight of a mixture of equal parts by weight of sodium nitrate and potassium nitrate. To a few grains of solid sodium hydroxide melted in a silver crucible, the phosphorus-iron-nitrate mixture was added and covered with an additional 2 g. of solid sodium hydroxide. The contents of the crucible were melted on a small flame and heated until all gas development stopped, after which heating was continued for about 15 minutes on a full flame. The green molten mass thus obtained was lixiviated, subsequent to cooling, with boiling water. The solution obtained was boiled again for 5 to 10 minutes, and then filtered out hot.

The precipitate, which contains all cationary impurities, such as radioactive cobalt and manganese, was dissolved in concentrated hydrochloric acid.

The radioactive, alkaline phosphate solution was acidified by means of concentrated nitric acid until the concentration of nitric acid was 1–n. Then 120 ccs. of a 10% bismuth nitrate solution in 1–n nitric acid was added to the hot solution. The precipitated bismuth phosphate was collected in a G-4 glass filter and washed with about 20 ccs. of weak dilute nitrated solution of bismuth nitrate.

The filtrate was then diluted by an equal volume of boiling water and boiled for half and hour to three quarters of an hour, while stirring thoroughly. A second, smaller quantity of bismuth phosphate was then precipitated. This quantity was also collected on a G-4 filter and washed. The filtrate no longer contained phosphate ions.

The bismuth phosphate was dissolved in hydrochloric acid. Then the bismuth ions were precipitated by bubbling through hydrogen sulphide, the bismuth sulphide obtained was filtered out and the solution of radioactive phosphoric acid thus obtained was evaporated to the thickness of syrup (temperature about 120°), in order to remove residues of hydrochloric acid.

*Example II*

About 2 g. of phosphorus iron which had been bombarded by deuterons was powdered finely in a mortar and mixed in a ratio of about one part to ten parts by weight of a mixture of equal parts by weight of sodium nitrate and potassium nitrate. To a few grains of solid sodium hydroxide melted in a silver crucible, the phosphorus-iron-nitrate mixture was added and covered with an additional 2 g. of solid sodium hydroxide. The contents of the crucible were melter over a small flame and heated until all gas development stopped, after which heating was continued for about 15 minutes over the full flame. Subsequent to cooling, the green molten mass thus obtained was lixiviated with boiling water. The solution obtained was boiled for 5 to 10 minutes and then filtered out hot.

The precipitate, which contains all cationary impurities such as radioactive cobalt and manganese, was dissolved in concentrated hydrochloric acid.

The radio-active, alkaline phosphate solution was acidified by means of concentrated nitric acid until the concentration of nitric acid was 1-n. Then 120 ccs. of a 10% bismuth nitrate solution in 1-n nitric acid was added to the hot solution. The precipitated bismuth phosphate was collected on a G-4 glass filter and washed with about 20 ccs. of weak dilute nitrated solution of bismuth nitrate.

The filtrate was then diluted by an equal volume of boiling water and boiled for half an hour to three quarters of an hour, while stirring thoroughly. A second, smaller quantity of bismuth phosphate was then precipitated. This was also collected on a G-4 filter and washed. The filtrate no longer contained phosphate ions.

The bismuth phosphate was dissolved in a hydrogen bromide solution. Then the bismuth ions were precipitated by diluting the solution by means of ten times the quantity of water at about 80° C., so that an insoluble bismuth salt was precipitated; the precipitate was filtered out and the solution of radioactive phosphoric acid thus obtained was evaporated to remove residue of hydrogen bromide.

What I claim is:

1. A method of separating radioactive phosphorus from deuteron-bombarded iron comprising the steps of forming an aqueous alkaline solution containing ions of the radioactive phosphorus and iron to precipitate iron hydroxide, separating the iron hydroxide from the solution containing radioactive phosphate ions, adding to the solution a water-soluble bismuth salt to precipitate insoluble bismuth phosphate, dissolving the bismuth phosphate in an aqueous solution of a hydrohalogenic acid, precipitating from the latter solution an insoluble bismuth salt while retaining in solution radioactive phosphate ions, and recovering radioactive phosphoric acid from said solution.

2. A method of separating radioactive phosphorus from deuteron-bombarded iron comprising the steps of forming an aqueous alkaline solution containing ions of the radioactive phosphorus and iron to precipitate iron hydroxide, separating the iron hydroxide from the solution containing radioactive phosphate ions, adding to the solution a water-soluble bismuth salt to precipitate insoluble bismuth phosphate, dissolving the bismuth phosphate in an aqueous solution of a hydrohalogenic acid, passing hydrogensulfide into the latter solution to precipitate bismuth sulfide while retaining in solution radioactive phosphate ions, and recovering radioactive phosphoric acid from said solution.

3. A method of separating radioactive phosphorus from deuteron-bombarded iron comprising the steps of forming an aqueous alkaline solution of the radioactive phosphorus and iron to precipitate iron hydroxide, separating the iron hydroxide from the solution containing radioactive phosphate ions, adding to the solution a water-soluble bismuth salt to precipitate insoluble bismuth phosphate, dissolving the bismuth phosphate in an aqueous solution of a hydrohalogenic acid, hydrolyzing the latter solution with water to form an insoluble bismuth salt while retaining in solution radioactive phosphate ions, and recovering radioactive phosphoric acid from said solution.

4. A method of separating radioactive phosphorus from deuteron-bombarded iron comprising the steps of forming an aqueous alkaline solution containing ions of the radioactive phosphorus and iron to precipitate iron hydroxide, separating the iron hydroxide from the solution containing radioactive phosphate ions, adding to the solution a water-soluble bismuth salt free of halides to precipitate insoluble bismuth phosphate, dissolving the bismuth phosphate in an aqueous solution of a hydrohalogenic acid, precipitating from the latter solution an insoluble bismuth salt while retaining in solution radioactive phosphate ions, and recovering radioactive phosphoric acid from said solution.

5. A method of separating radiocative phosphorus from deuteron-bombarded iron comprising the steps of forming an aqueous alkaline solution containing ions of the radioactive phosphorus and iron to precipitate iron hydroxide, separating the iron hydroxide from the solution containing radioactive phosphate ions, addition to the solution bismuth nitrate to precipitate bismuth phosphate, dissolving the bismuth phosphate in an aqueous solution of a hydrohalgenic acid, precipitating from the latter solution an insoluble bismuth salt while retaining in solution radioactive phosphate ions, and recovering radioactive phosphoric acid from said solution.

References Cited in the file of this patent

UNITED STATES PATENTS

| 1,889,929 | Moore | Dec. 6, 1932 |
| 1,951,077 | Woodstock | Mar. 13, 1934 |
| 2,174,158 | Kepfer | Sept. 26, 1939 |
| 2,552,032 | Booth | May 8, 1951 |
| 2,600,813 | Tidwell | June 17, 1952 |
| 2,653,076 | Cohn | Sept. 22, 1953 |

OTHER REFERENCES

Mitchell: "Advances in Analytical Chemistry," vol. II, pages 57–58, P. Blakiston and Co. Philadelphia, 1931.

Mellor: "Comprehensive Treatise on Inorganic and Theoretical Chemistry," vol. 9, pages 712, 713, Longmans, Green Co., New York, 1929.

Rodden: "Analytical Chemistry of the Manhattan Project," McGraw-Hill Book Co., New York, 1950, December 8, vol. I, pages 332–333.

Handbook of Physics and Chemistry, 27 edition, Chemical Rubber Pub. Co. 1943, Cleveland, pages 396–397; items 33 and 34.